US012790140B2

(12) United States Patent
Felip Leon et al.

(10) Patent No.: US 12,790,140 B2
(45) Date of Patent: Nov. 10, 2026

(54) SMART SENSING FOR PALLET LOADING AND UNLOADING

(71) Applicant: Intel Corporation, Santa Clara, CA (US)

(72) Inventors: Javier Felip Leon, Hillsboro, OR (US); David Gonzalez Aguirre, Portland, OR (US); Javier Turek, Beaverton, OR (US); Atul N. Hatalkar, Chandler, AZ (US); Robert Lawson Vaughn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 18/397,627

(22) Filed: Dec. 27, 2023

(65) Prior Publication Data

US 2025/0214788 A1 Jul. 3, 2025

(51) Int. Cl.

| | |
|---|---|
| ***B65G 61/00*** | (2006.01) |
| ***B65G 43/08*** | (2006.01) |
| ***B65G 57/00*** | (2006.01) |
| ***B65G 57/09*** | (2006.01) |
| ***G02B 27/18*** | (2006.01) |

(52) U.S. Cl.

CPC ............. *B65G 61/00* (2013.01); *B65G 43/08* (2013.01); *B65G 57/00* (2013.01); *B65G 57/09* (2013.01); *G02B 27/18* (2013.01); *B65G 2201/0258* (2013.01); *B65G 2201/0267* (2013.01); *B65G 2203/0233* (2013.01); *B65G 2203/042* (2013.01); *B65G 2203/044* (2013.01)

(58) Field of Classification Search

CPC ........ B65G 61/00; B65G 43/08; B65G 57/00; B65G 57/09; B65G 2201/0267; B65G 2203/0233; B65G 2203/042; B65G 2203/044; B65G 47/74; B65G 2201/0258; B65G 2201/0285; G02B 27/18

See application file for complete search history.

(56) References Cited

U.S. PATENT DOCUMENTS

| | | | | |
|---|---|---|---|---|
| 9,714,145 | B1 * | 7/2017 | Lehmann | B65G 61/00 |
| 2009/0018693 | A1 * | 1/2009 | Zimmermann | G02B 27/20 700/166 |
| 2020/0376662 | A1 * | 12/2020 | Arase | B25J 9/1687 |
| 2021/0276807 | A1 * | 9/2021 | van Schijndel | B65G 1/1375 |
| 2022/0402139 | A1 * | 12/2022 | Pidaparthi | B25J 9/163 |

FOREIGN PATENT DOCUMENTS

| | | | | |
|---|---|---|---|---|
| CN | 118618911 A * | 9/2024 | | B25J 9/1697 |
| DE | 102020114577 B4 * | 5/2022 | | G05B 19/41895 |
| WO | WO-2019125613 A1 * | 6/2019 | | B65G 61/00 |

* cited by examiner

*Primary Examiner* — Thomas Randazzo

(74) *Attorney, Agent, or Firm* — Banner & Witcoff, Ltd.

(57) ABSTRACT

A pallet loading system may comprise a processor, and memory with instructions stored thereon that, when executed by the processor, cause the processor to receive package loading data, the package loading data including characteristics of a package to be placed on the pallet and characteristics of a loading operator. A placement location for the package on the pallet may be determined using an artificial intelligence (AI) or machine learning (ML) algorithm based on the characteristics of the package and the characteristics of the loading operator and a visual marking (such as a visual projection) may be displayed at the placement location. The system may output an instruction to the loading operator to place the package at the displayed placement location.

19 Claims, 10 Drawing Sheets

TOP CAM VIEW

FRONT CAMERA VIEW

SIDE CAMERA VIEW

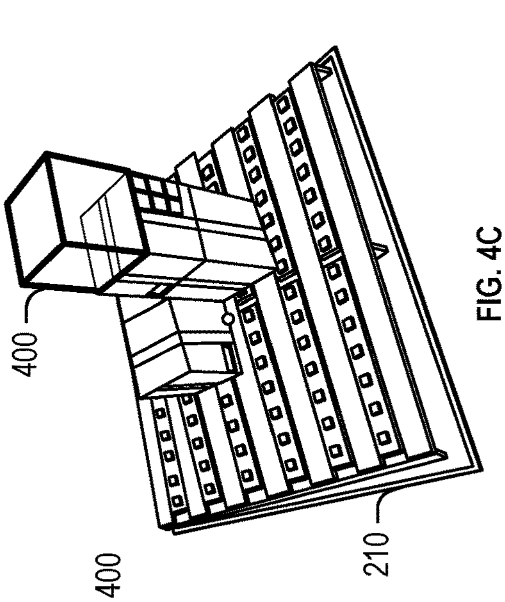
FIG. 4C
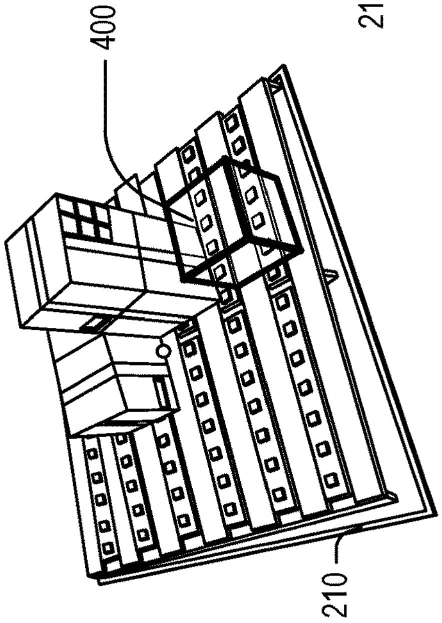
FIG. 4B
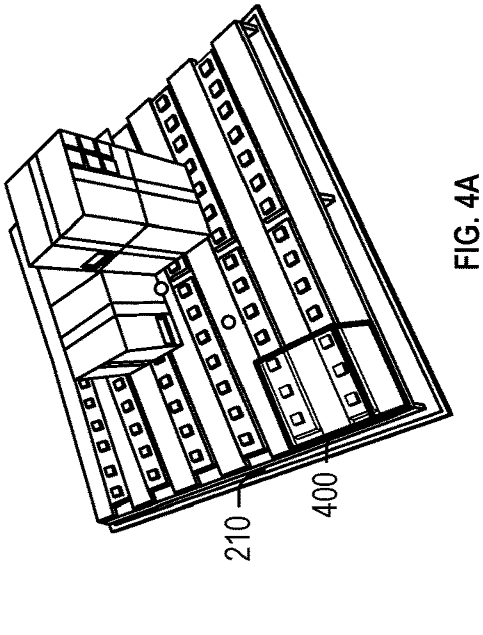
FIG. 4A
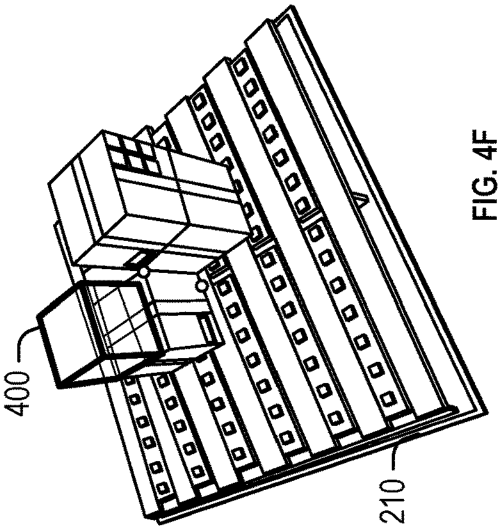
FIG. 4F
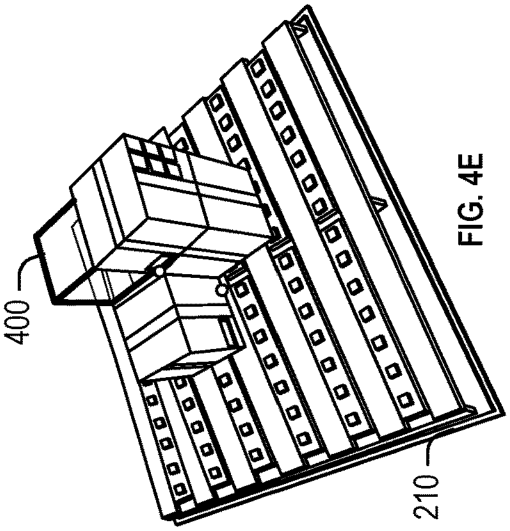
FIG. 4E
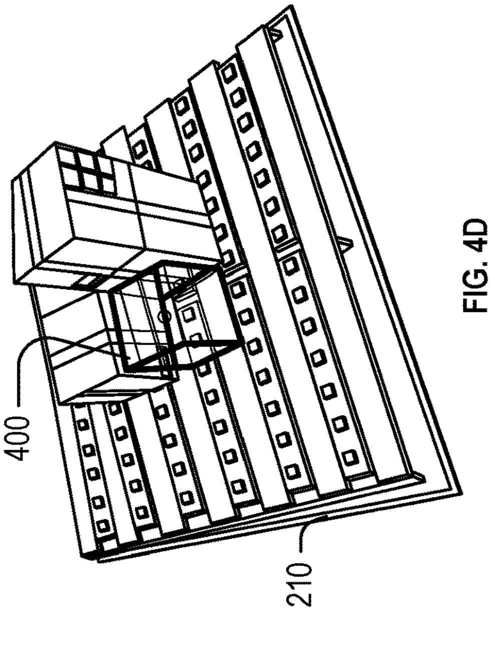
FIG. 4D
FIG. 4

SMART SENSING FOR PALLET LOADING AND UNLOADING

BACKGROUND

Pallets are commonly used to transport and store packages or objects in batches. Palletization is the act of packaging and securing goods onto pallets in preparation for shipment. During palletization, cargo is stacked onto pallets and secured with straps or some kind of wrapping (e.g., plastic) to stabilize the cargo and, in some cases, permit pallets to be stacked. Often times, large quantities of similar or identical items are loaded or stacked onto a pallet and stored for (bulk) shipping or until items are placed on a shelf (e.g., at a retail store). Palletization can be performed by humans, robots, or a combination of humans and robots, meaning palletization can be performed manually or automatically.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4A-4F illustrates candidate placement location for a package generated using a placement selection algorithm.

DETAILED DESCRIPTION

Figure 1A:
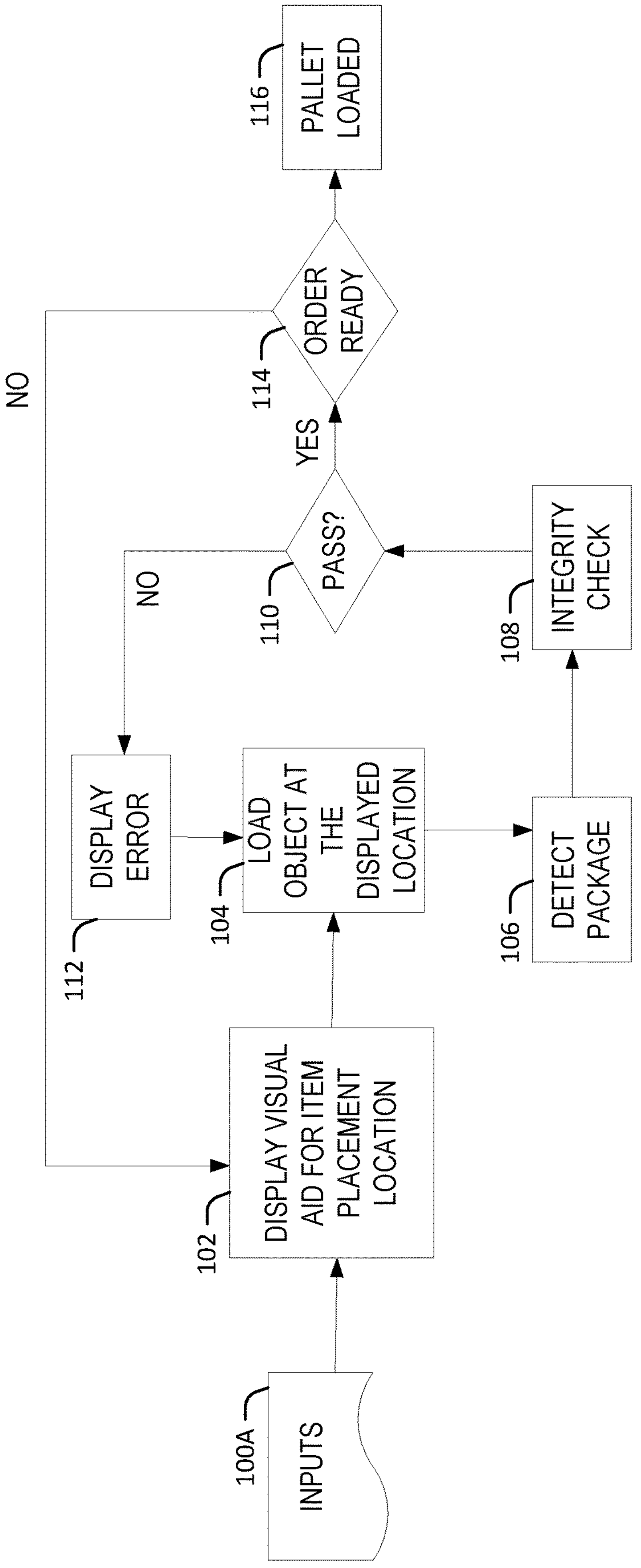
FIGS. 1A and 1B illustrate examples of a flowchart for operation of a smart pallet loading/unloading system.

Pallets are used to store and transport packages (e.g., boxes) or objects in groups or batches. Many times, pallets are loaded with a quantity of the same or similar items to be shipped. The pallets can be loaded and the items secured, for example, using plastic wrap to secure the items together and/or to the pallet itself. During palletization, objects can be misclassified or damaged resulting in inventory mismatching that requires attention and analysis and possible rearrangement. These issues can increase warehouse storage and retrieval times and may impact product time to market or a supply chain. These issues can also result in incorrect or damaged goods being shipped to customers and subsequently returned by the customers, which can result in a loss of time, effort and/or money by the seller and the customer.

The pallet loading and unloading process provides an opportunity to perform package and integrity checks to mitigate, limit, or reduce the chance of items being stacked on the pallet incorrectly, items on the pallet being damaged, or an already damaged item being stored on the pallet. Furthermore, the loading and unloading process provides an opportunity to store objects in an ordered manner to improve inventory management and to improve retrieval times.

The present disclosure relates to a system that may include a pallet loading area that provides an aid to an operator. The aid may be of visual, acoustic (e.g. acoustic signal, voice) or haptic nature, or a combination. The visual aid may include a projected marking (e.g., a laser or similar light projection, or the like) showing the operator where to stack the next package or object awaiting palletization, or show the operator a path or direction the package or object should take for palletization. Additionally, the loading area may include a measurement member or device, such as a platform or sensor array onto which the pallet may be placed. The measurement member may include a plurality of sensors to check package weight, determine package integrity, and provide data to be used in planning package placement on the pallet so that the pallet load has a centered Center of Mass (COM) and controlled inertial properties. The presently disclosed system may utilize a combination of perception, planning, and active projection algorithms that result in a smart pallet loading area that may be capable of testing the integrity of packages that are stacked or loaded on the pallet, verifying the properties of the packages (e.g., verifying vendor, verifying the weight of the packages, verifying the inertial properties of the packages, or the like), and displaying the properties for each package. In addition, aforementioned testing or verification information may be recorded e.g. directly on packages, objects, or pallets (e.g. by stick-on labels) or in a digital repository with testing or verification information linked to package, object, or pallet identifiers. The presently disclosed system may also provide precise positioning information showing where the packages should be placed so that operators can dependably, securely and effectively perform pallet loading or unloading operations.

The algorithms used by the system may increase the productivity of manual packing procedures where humans are required to load the pallets and may accelerate automated pick-and-place tasks in which automated systems (e.g., robots) perform the loading and unloading. The algorithms may include an artificial intelligence (AI) or machine learning (ML) or other algorithm (e.g., a non-AI or non-ML deterministic algorithm) or process. Additionally, or alternatively, some operations of the system may be made using a hardware-based feedback loop or feedback control (e.g., the hardware-based feedback loop or feedback control may also be used in conjunction with the deterministic algorithms).

Potential advantages of such a system include providing a visual aid or marker for package placement, which may reduce the time and effort needed to load the pallet and reduce loading error that humans are susceptible to making. Furthermore, the system may verify, using the measurement member and/or a plurality of sensors connected to or communicatively coupled to the measurement member, that objects on the pallet are settled, loaded in the correct order and orientation, and have no evidence of damage. The system may also allow for digitization of objects on the pallet for quick inventory, product indexing, and integrity verification. As used herein, the terms "loading" and "unloading" may be used as alternates for each other and may include stacking items on a pallet, reorganizing items on a pallet, stacking bundles of items on a pallet, removing items from a pallet, or the like. Likewise, the terms "item (s)", "package(s)", object(s), and box(es)" may be used as alternates for each other and refer to anything to be stacked or loaded onto the pallet.

Figure 1B:
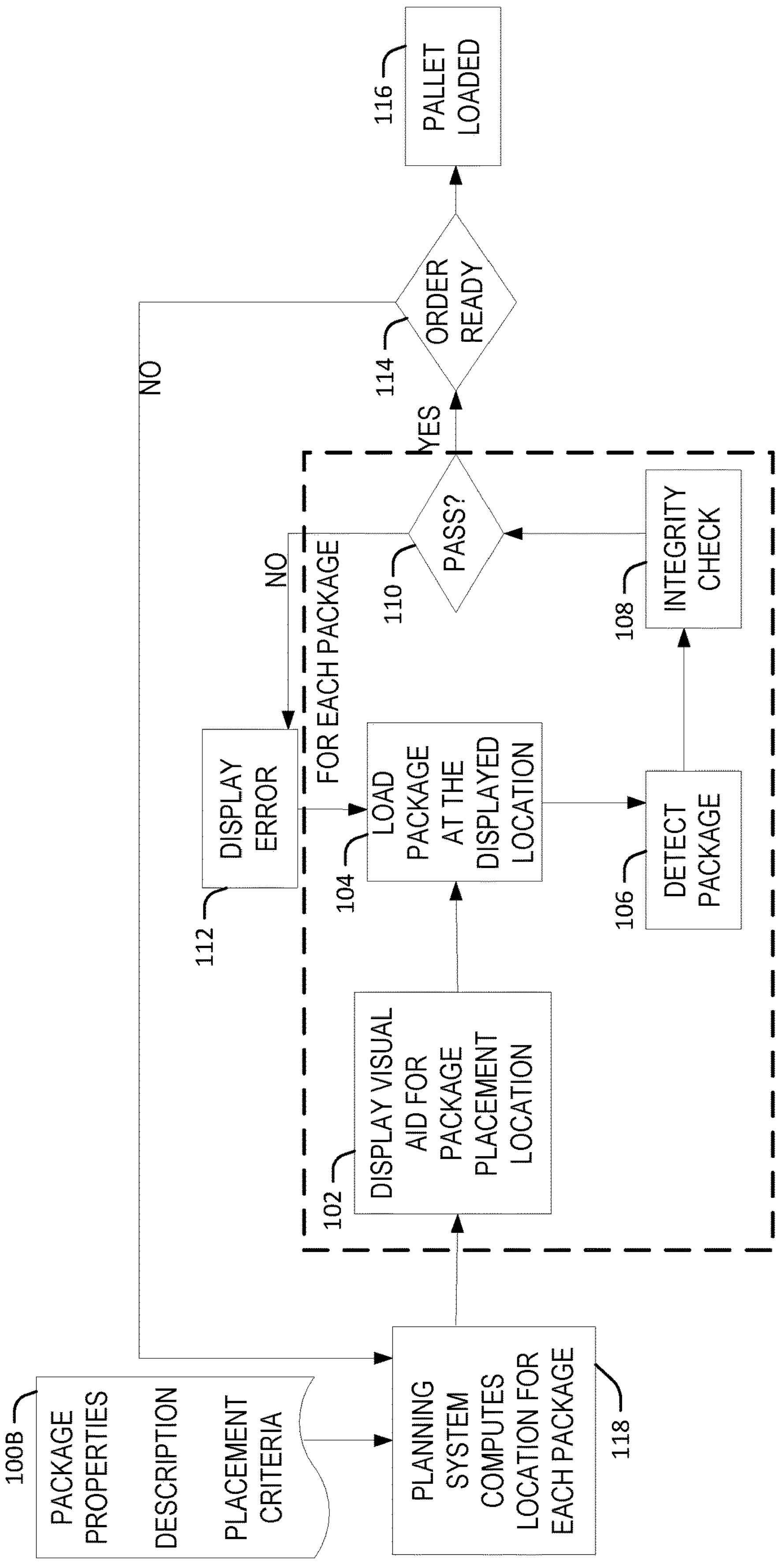

FIGS. 1A and 1B illustrate examples of a flowchart for operation of a smart pallet loading system. As illustrated in FIGS. 1A and 1B, one or more inputs 100A and 100B for a package to be placed on a pallet may be entered into a system for smart palletization. As illustrated in FIG. 1B, the inputs 100B (collectively "input criteria") may include one or more package properties, such as package weight or package dimensions (e.g., length, width, and height), may include an order description, such as the contents of a package, and one or more placement criteria. In an example, the placement criteria may include whether the packages can be stacked upon, the fragility of the contents of the package, or the like. The placement criteria may further include information about the capability of an operator. The operator may be an entity that is loading (or tasked to load) the pallet. The operator may be a human or may be a robot (e.g., a drone, or any similar autonomous loading device) or a combination of the two. When the operator is a human, the human may be wearing an exoskeleton or using a similar device that can enhance the capabilities of the human such as how much the human operator can lift, how high the human operator can reach, or the like. In some instances, the human may use a forklift or other mechanical aid to load the pallet. In the case of a robotic operator, the robot may have a limit to the amount of weight it can lift at one time, how large a package, box, or item the robot can maneuver, or the like. The input criteria may further include an order description. The order description may indicate contents of the packages in the order, a quantity of the number of packages in the order, or the like.

At 118, the package properties, order description, and placement criteria may be sent or transmitted to a planning system. The planning system may compute or determine a location for each package on the pallet. At least some of the input criteria information (e.g., vendor information, weight, or the like) may be obtained from a packing list, invoice, bill of lading, or any similar packing document that can be input into the planning system. In another example, the input criteria may be obtained from one or more sensors, such as an imaging sensor, a scanner, or the like. The imaging sensor may include one or more cameras to visualize the loading area. The imaging sensor may transmit an image to the planning system. The planning system may determine, based at least in part by the image, an operator type (e.g., human, robotic, or a combination) and the operator capabilities.

In some examples, the one or more sensors may obtain information from a badge, a Quick Response (QR) code, or the like, which may include electronically stored or embedded information regarding the capability of the operator. For example, when the operator is a human, the badge may contain information about how much the human operator can lift, any restrictions on the human operator, or the like. Similarly, when the human operator is wearing an exoskeleton, or when the operator is robotic, a code located on the exoskeleton or the robot may include its operational capabilities. Based on the determination of the operator type and the capability of the operator, and the other input criteria, at 102 the system may display a visual aid for item placement location. For example, as discussed below, the visual aid may be an augmented reality projection showing the item placement. The projection may be a laser projection onto the pallet showing where an item should be placed. In another example, a QR code may be projected onto the pallet and scanned by a robotic operator with instructions for the robotic operator to load or place an item on the pallet. Additionally, or alternatively, the visual display may be performed on a graphical user interface (GUI) such as a monitor or a screen. For example, the loading area, including the pallet, may be displayed on the GUI and a visual marker or cue for placement of the packages may be displayed on the GUI. The display of the loading area on the GUI may be a real-time video display or an augmented or virtual reality display (e.g., a digital twin). In an example, the system may determine preferred conditions for the loading area taking into account operator capabilities. For example, the system may determine a preferred technique for the operator to pick up and load the packages. When the operator is a human, the system may determine that the packages should be loaded in such a way that the amount of times the human has to bend over is reduced and select the placement location for each package accordingly. On the other hand, when the operator is a robot, the system may adjust lighting conditions in the loading area for optimal sensor data collection and quality.

Responsive to the visual display, at 104 the package may be loaded at the displayed location and at 106 the system may detect, using a plurality of sensors that the package has been loaded. The plurality of sensors may include the imaging sensors discussed above located in and around the loading area. The plurality of sensors may also include sensors (e.g., physical measurement sensors or equipment) located on or below the pallet. The physical sensors may include Force Sensing Resistors (FSRs) placed on the pallet at various locations (e.g., in an array) to detect the presence of a package, detect if the package is present in the correct location on the pallet, and detect if the package is correctly settled (e.g., lying or sitting flat) in the assigned location. The physical sensors may also include optical distance sensors, such as infrared sensors or Light Detection and Ranging (LIDAR) sensors. The physical sensors may be located on or included in one or more measurement platforms, or a similar measurement member) that may be located below the pallet (or onto which the pallet may be placed). For example, the physical sensors may be located on a hydraulic platform or a series of hydraulic platforms located below the pallet. In such an example, the hydraulic platform may raise so that at least a portion of the platform may extend above the slats in the pallet and take measurements when the packages are loaded onto the pallet.

In response to the package being detected on the pallet, and using at least a portion of the input criteria, at 108 an integrity check of the package may be performed. The integrity check may include determining that the package is at the location that was displayed at 102, whether the package is an expected weight (and thus is likely to contain the expected item(s)), whether the package is stable on the pallet, whether the package appears undamaged, or the like. At 110, when the package passes the integrity check, the system may check to determine that the entire order is ready at 114 (e.g., that all packages expected to be on the pallet are loaded). When the order is determined to be ready, at 116, the system may consider the pallet loaded and at that point the pallet may be wrapped (e.g., wrapped in plastic) and moved from the loading area (e.g., stored, stacked on another pallet, loaded into a shipping container or a trailer, or the like). When the order is determined not to be ready at 114, the system may return to 102 (as illustrated in FIG. 1A) or to 118 (as illustrated in FIG. 1B) to determine the location for placement of the next package.

If at 110, the package does not pass the integrity check, at 112 an error may be displayed or otherwise indicated. In an example, the error may include a visual indicator such as a colored or blinking light in the loading area. For example, when a package is loaded incorrectly, the visual loading aid discussed above may blink or turn color (e.g., from blue or green to red). Additionally, or alternatively, the error may include an audio indicator such as a beep or a warning sound. In another example, the indicator may include a message, such as a pop-up on the GUI with specifics about the error, and instructions to mitigate the error. For example, when the error is a weight error that indicates that an incorrect package has been placed on the pallet, a message instructs the operator to remove the package from the pallet and place it aside (e.g., in a designated area) to be inspected. A similar message may be displayed when the package appears damaged so that the contents of the package may be broken or damaged. When the error is that the package is not loaded in a stable manner, the message may display instructions to reposition or otherwise stabilize the package on the pallet at the designated location.

When the error indicates that the package is in an incorrect location or needs to be repositioned, the system may instruct the operator to load the object at the displayed location (returning to 104) and repeat the package detection and integrity checks until the package passes the integrity check at 110. As illustrated by the dashed box in FIG. 1B, the Operations of displaying the visual aid at 102, loading the package at the displayed location at 104, detecting the package at 106, and performing the integrity check at 108, may be conducted for each package in the order until the order is ready at 114.

Figure 2A:
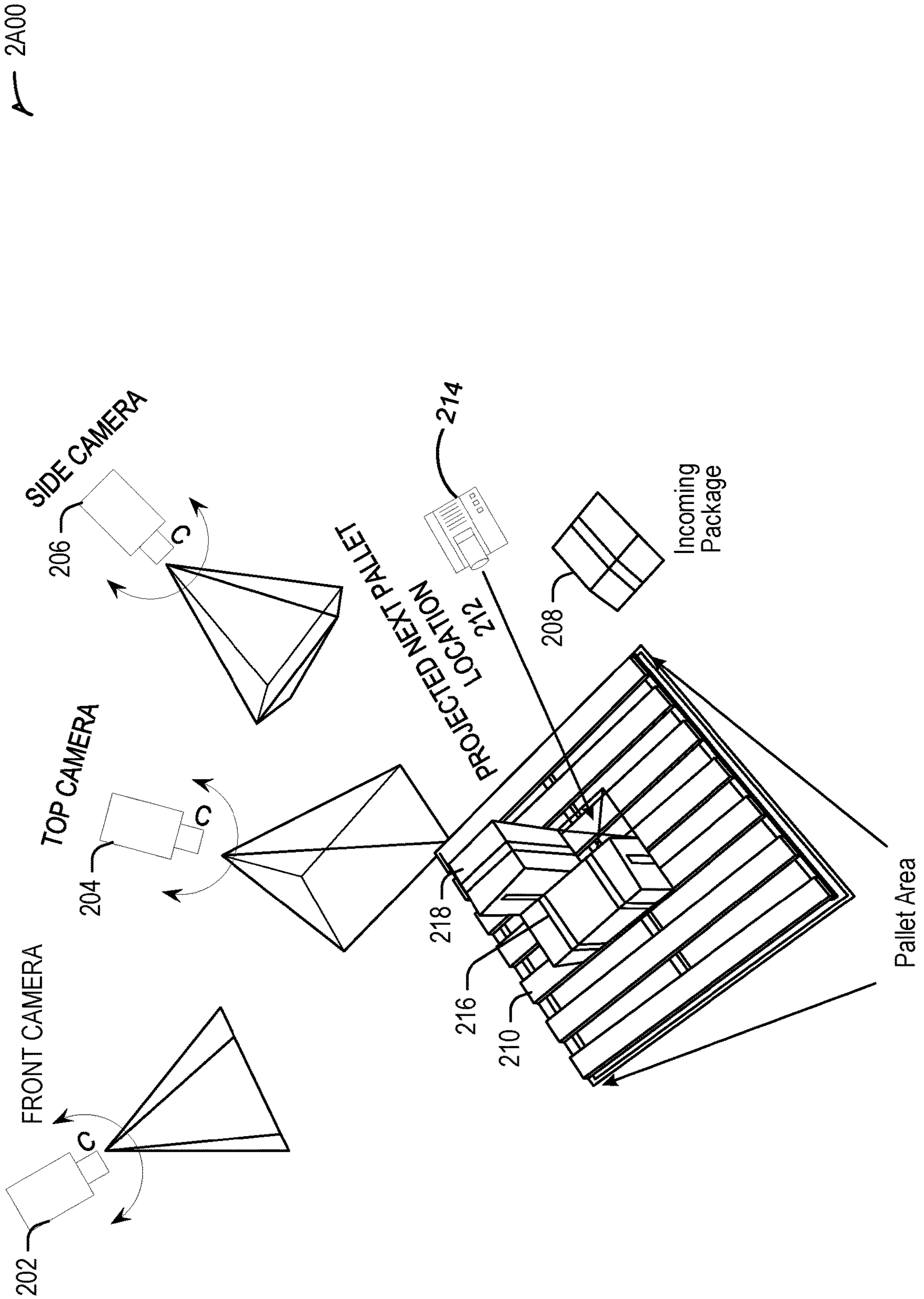
FIG. 2A illustrates an example of a pallet loading active sensing area.

FIG. 2A illustrates an example of a pallet loading active sensing area 200. The pallet loading active sensing area 200 may include means for visualizing the pallet loading active sensing area 200. The means for visualizing may include one or more imaging members or imaging devices. The imaging devices may include one or more cameras such as a front camera 202, a top camera 204, and a side camera 206 (collectively "the cameras") to visualize a pallet 210, an incoming package 208, a first loaded package 216, a second loaded package 218, and any pallet operators (not shown). The cameras may be a Red, Green, Blue (RGB) camera, a Pan, Tilt, Zoom (PTZ) camera, a depth camera, or any similar camera capable of capturing an angle of the pallet loading active sensing area 200. While three cameras are illustrated in FIG. 2A, any number of cameras may be located at any number of locations in the pallet loading active sensing area 200 so as to capture, image, view, or the like, all desired angles of the pallet loading active sensing area 200. The pallet loading active sensing area 200 may also include one or more projecting means or members. For example, a laser projector or other projection device may be included on one or more of the cameras. Additionally, or alternatively, a projector 214 may be used to project the Projected Next Package Location 212 (denoted by the "x" where the arrow is pointing) on the pallet 210. Just as the pallet loading active sensing area 200 may include any number of desired cameras or other imaging devices, any number of projectors may be included so that the Projected Next Package Location 212 may be displayed anywhere on the pallet 210.

Figure 2B:
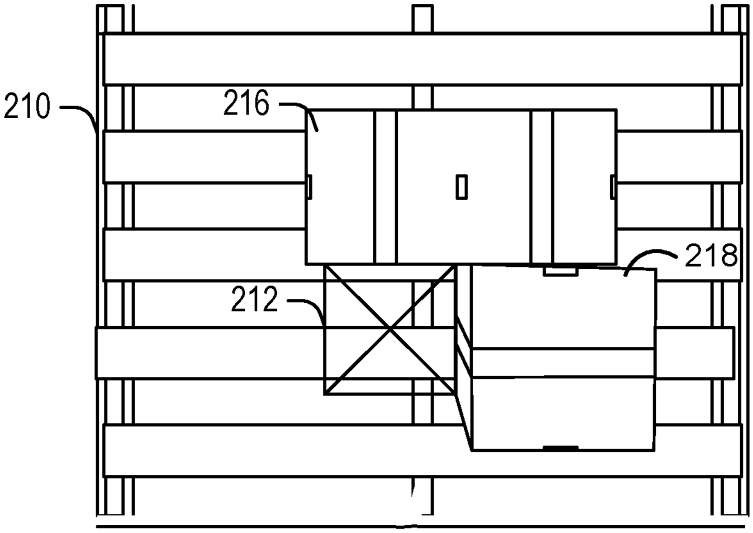
FIGS. 2B-2D illustrate views from different cameras included in the pallet loading active sensing area illustrated in FIG. 2A.
Figure 2C:
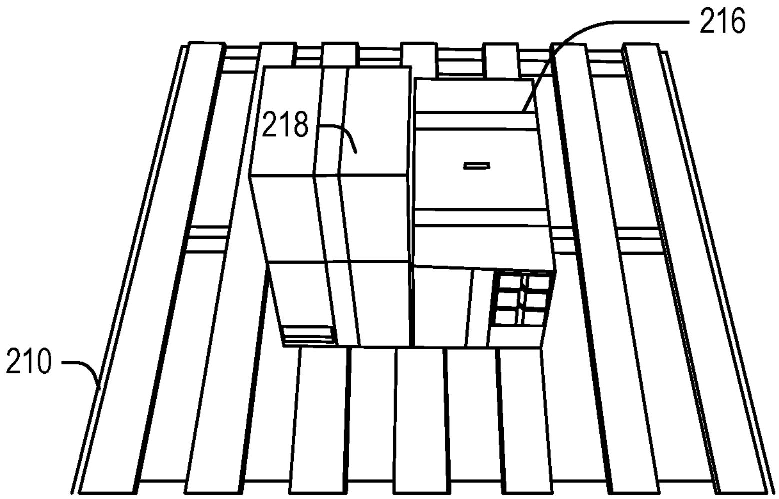
Figure 2D:
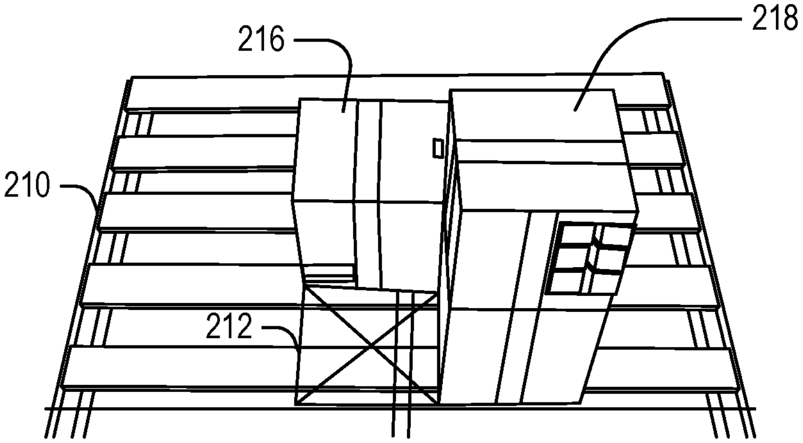

FIGS. 2B-2D illustrate views from different cameras included in the pallet loading active sensing area illustrated in FIG. 2A. As illustrated in FIG. 2B, the top camera 204 may be located so as to be able to image or view the pallet 210 from directly above (or from substantially directly above the pallet 210). In this view, the Projected Next Package Location 212 may be viewed in relation to the first loaded package 216 and the second loaded package 218. As illustrated in FIG. 2C, the view from the front camera 202 may visualize the front of the pallet 210 from above the pallet 210. From this view, the Projected Next Package Location 212 is obscured by the first loaded package 216 and the second loaded package 218. As illustrated in FIG. 2D, the view from the side camera 206 may visualize a side of the pallet 210 (e.g., a left or right side). From this view, the Projected Next Package Location 212 is visible behind the first loaded package 216 and next to the second loaded package 218.

Figure 3:
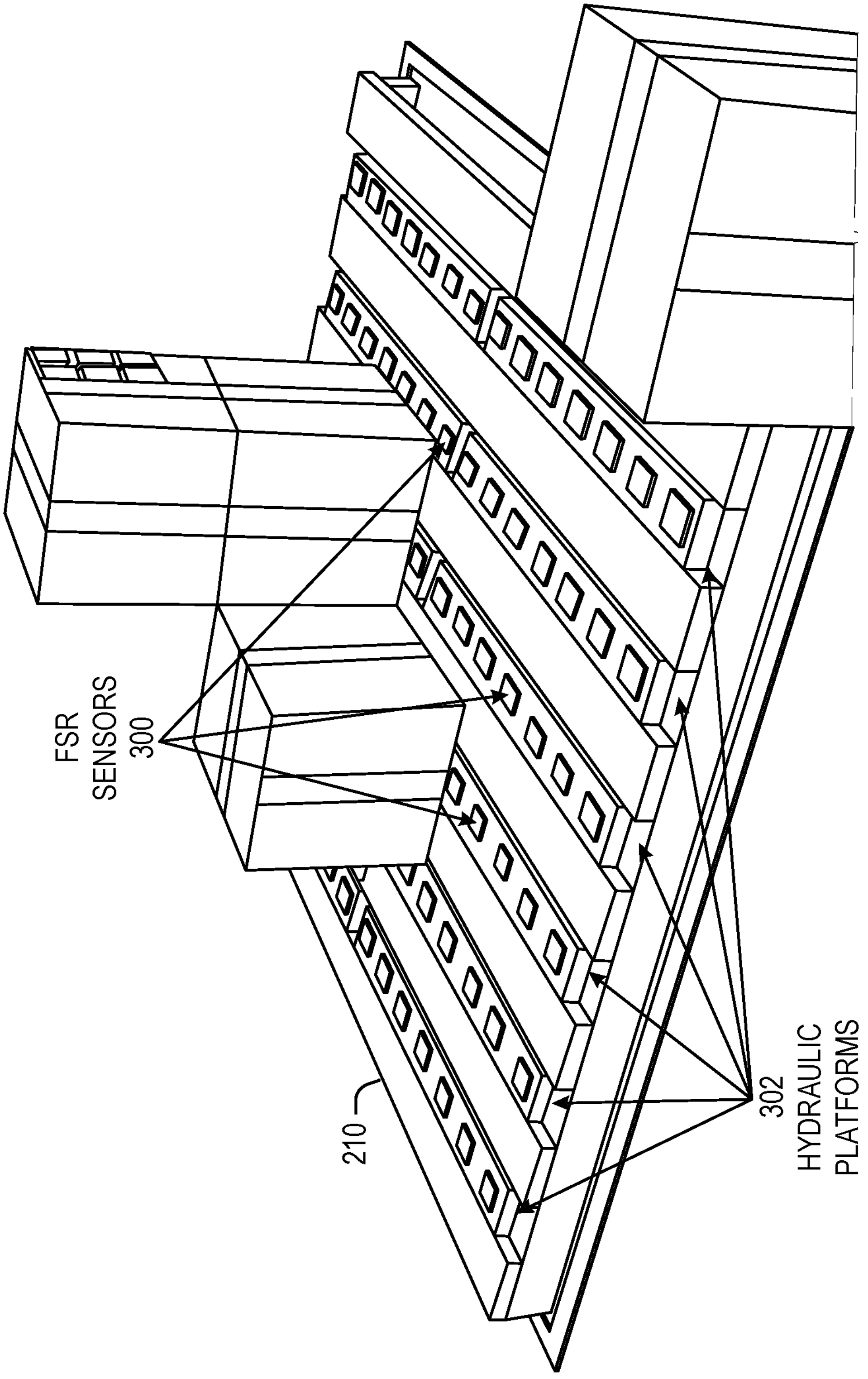
FIG. 3 illustrates an example of a pallet measurement platform.

FIG. 3 illustrates an example of a pallet measurement platform. As illustrated in FIG. 3, a measurement means or member may be located underneath the pallet 210 (e.g., the pallet 210 may be set on top of or otherwise located above the measurement member). The measurement member may include a measurement platform or a series of measurement platforms such as, for example, hydraulic platforms 302. The hydraulic platforms 302 may be arranged beneath the pallet 210 so that they can be raised up or protrude through slats in the pallet 210. The measurement platform may include a plurality of sensors such as Force Resistance Sensors (FSR sensors 300). The FSR sensors 300 may be placed on the hydraulic platforms 302 so that they are arrayed at various locations throughout the area occupied by the pallet 210. The FSR sensors 300 may detect the presence of a package at specific locations on the pallet 210 and determine if the package is set (or settled) correctly and is lying or sitting flat or stable at the assigned or determined location. The system may also include a computer or other machine such as described below for FIG. 6, to which the cameras or the sensors may be discussed herein may be connected or coupled to. A processor of the machine may be connected to memory with instructions that cause the processor to execute the Operations discussed in FIGS. 1A and 1B, or the Operations of the method discussed for FIG. 5.

In addition to the FSR sensors 300, additional sensors such as distance sensors (e.g., optical or capacitive distance sensors, or the like) LIDAR sensors, etc. The distance sensor may be used in conjunction with the FSR sensors 300 or the cameras to determine whether the packages are properly spaced on the pallet 210 during the integrity check at 108 discussed above. For example, when placing or removing a package from the pallet 210, the system may, during the integrity check, use the cameras to determine if there is visible damage and use the FSR sensors 300 or another weight sensor to determine whether the package is an expected weight. The expected weight of the package or other similar details may be determined or retrieved from a shipping manifest or similar document, or from a database containing information regarding the package properties or contents. By measuring the weight added to or removed from the pallet, the system can determine whether the package is correct. Additionally, if all of the packages or objects contained in the packages are expected to be the same, the system may estimate the number of objects contained in the package and mark the package (or instruct the operator to mark or set aside the package) to be inspected if a mismatch or error is determined.

The cameras or other imaging sensors in the pallet loading active sensing area 200 may be used to fit cubic models of the packages and examine the packages for defects. When appearance or shape defects are detected for a package, the system may evaluate to what extent the detected damage may jeopardize the integrity of the items contained in the package. Using the item description, a fragility index, fragility score, fragility rating, or the like, may be determined by the system for the package. The fragility index may be determined based at least in part on one or more of: a) common knowledge from a natural language artificial intelligence (AI) or machine-learning (ML) model or other similar deterministic model, 2) transport statistics, or 3) image analysis of package fragile labeling (e.g., obtained via optical character recognition of package labeling). Again, the system may identify, mark, or the like, or instruct the operator to set a damaged package aside for inspection based on a correlation or comparison of the damage to the package and the determined fragility index.

Depending on the packages already on the pallet and their estimated mass and inertial properties, the planning algorithm discussed above may decide where the next package should be placed. The placement may be determined so as to make the center of mass of the pallet as close as possible to the geometrical center. Such a placement of the packages or bundles of packages may make moving the pallet more stable and may result in a more predictable and controllable inertia.

When different packages from different vendors are to be loaded onto the pallet, the different vendors may use different communication protocols to electronically convey the package details. The system may convert the different communication protocols into a standard communication protocol when conveying the information to a robotic operator or to store the information in the database. Once the order is complete and the pallet is ready for packing (e.g., ready for shipping), statistics (e.g., total weight, center of mass, etc.) of the loaded pallet may be displayed (e.g., on the GUI) or otherwise conveyed to the operator.

As discussed above, the algorithm may include an artificial intelligence (AI) or machine learning (ML) or other algorithm (e.g., a non-AI or non-ML deterministic algorithm) or process. In an example, a Monte Carlo algorithm may be used to determine different package configurations and suggest the most stable configuration by projecting the desired package location on the pallet (or on a box already loaded on the pallet) as discussed above. This determination may be made based not only on the next package to be loaded but based on the number (and the characteristics) of one or more additional packages to be loaded onto the pallet.

The state of the pallet may be determined by the position ($x \in R^3$), orientation ($\theta \in H$), mass ($M \in R$), inertia ($I \in R^{3\times3}$), and size ($s \in R$) of the packages placed on the pallet. Therefore, a pallet may be represented by the tuple of those elements $P=(x, \theta, M, I, s)_N$. The possible options to place a new package on the pallet depend on the incoming package properties and its estimated mass, inertia, and size. The Monte Carlo algorithm (or any similar algorithm) may be used to sample the possible positions and orientations on the pallet and the possible values for its mass, inertia, and size according to the uncertainties of the perception system. The Monte Carlo algorithm may be especially useful to determine package location because it may take into account elements such as capability of a user which may prevent taking the derivative of a cost function. For example, using a cost function a derivative of the cost function may be used to reduce the distance from the center of mass of the pallet. But, since elements such as operator capability are included, the cost function cannot be easily optimized since a change to the operator ability may cause the cost function to change abruptly making it impossible or impractical to take the derivative of the cost function.

FIGS. 4A-4F illustrate candidate placement locations for a package generated using a placement selection algorithm. As illustrated in FIGS. 4A-4F, several different candidate placement locations for a candidate package 400 (illustrated by the transparent box) on the pallet 210 may be selected or determined by the algorithm. The algorithm may select one of these candidate placement locations for the candidate package 400 on the pallet 210 as a maximum likelihood location. The maximum likelihood location may minimize the distance of center of mass of the pallet 210 to the geometrical center of the pallet 210, and the distance of the inertia matrix (e.g., a diagonal inertial matrix) to the identity. In 3D rigid objects, the inertia (their resistance to changes in velocity) is expressed by a 3×3 matrix that expresses how difficult is to linearly accelerate an object in any direction and to angularly accelerate an object on any axis. For objects to have an identity matrix means that objects are easier to manipulate and do not have unexpected responses to forces applied to them. Therefore, it may be beneficial to have objects with diagonal inertia matrices.

In some examples, the maximum likelihood location selected from the candidate placement locations may not be the best overall option for the placement of the next package to be placed on the pallet 210. The algorithm may simulate future possible packages in a sequence until the pallet 210 is fully populated. Thus, the algorithm may randomly sample where on the pallet 210 all of the packages to be loaded onto the pallet 210 could be placed and optimize their placement location so that when the pallet 210 is fully loaded, it has the optimized inertial and center of mass properties. The placement locations may also be optimized based on the package contents, operator capabilities, or the like. This random sampling of the possible package locations may mitigate or reduce the artifacts and drawbacks of a greedy Monte Carlo algorithm. For example, Monte Carlo algorithms may overlook some valid configurations and converge on a single configuration. When a valid configuration is found, it may be difficult for such sampling algorithms to escape the attraction field of the solution to explore the remaining solution space and find other valid solutions. This is known as the mixing-problem. Including the prior knowledge may make the random sampling generate solution candidates that are more diverse and converge to different valid configurations. Examples of artifacts are biased sampling, low-mixing and mode collapse. In an example, a Monte Carlo tree search may be used in conjunction with the development of reinforcement learning algorithms to find the next best placement of a package on the pallet.

The examples discussed herein may be applicable to loading the pallet or unloading the pallet. When unloading the pallet, the Monte Carlo algorithm may randomly select the packages to remove (e.g., what order to remove the packages from the pallet) so that the removal of the packages disrupts the pile stability the least (or has the least impact on the instability of the pile). Thus, unordered removal of packages which may result in packages falling and becoming damaged or injuring loading operators, may be lessened. When the Monte Carlo algorithm terminates with high uncertainty, the system may mark the package as unsuitable for placement on the pallet and suggest placing the package in a waiting area. As the pallet loading continues, the packages in the waiting area may be reconsidered for placement.

Figure 5:
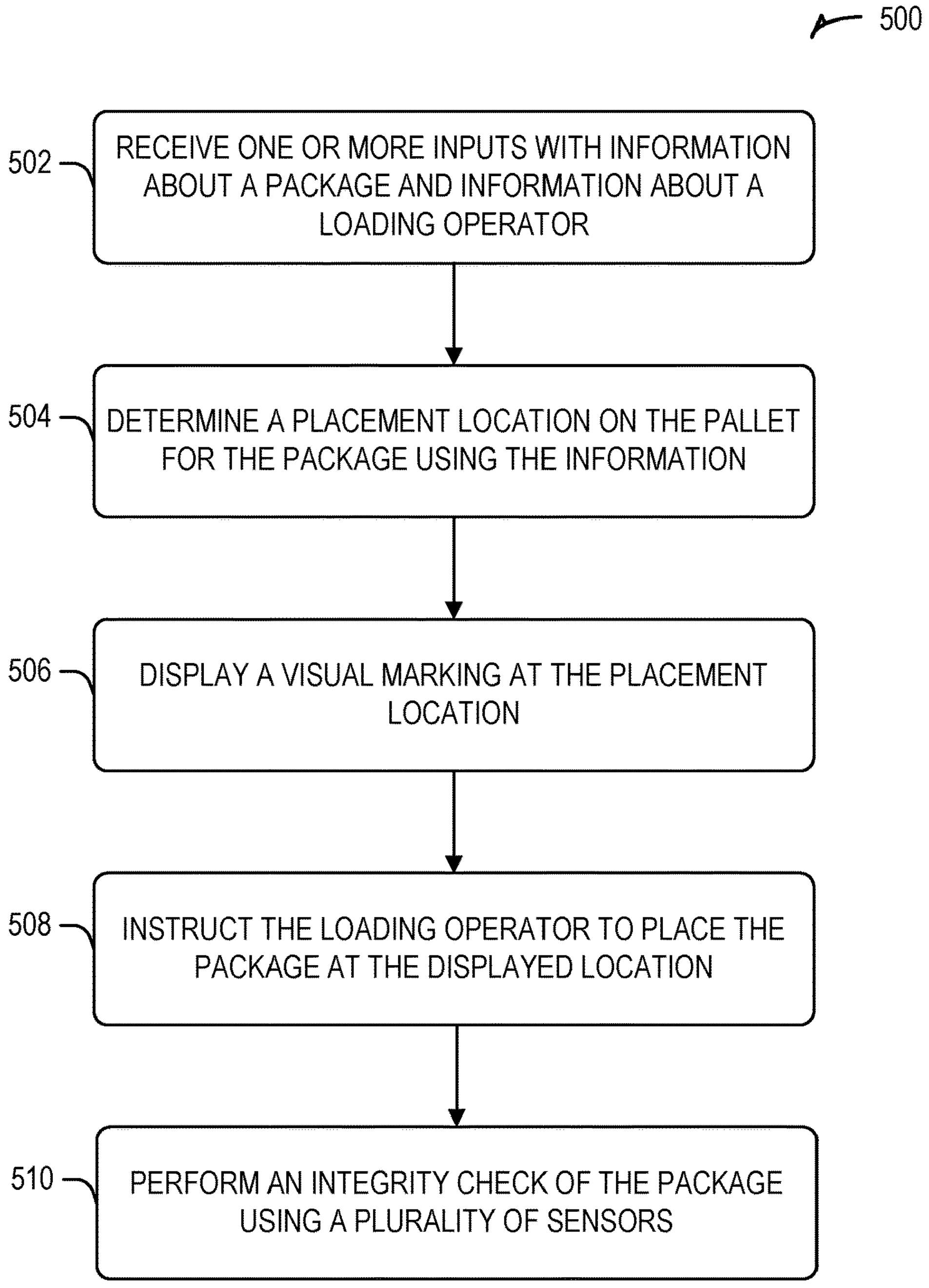
FIG. 5 illustrates an example of a computer-implemented method for pallet loading.

FIG. 5 illustrates an example of a computer implemented method for pallet loading. The method 500 may include or comprise a number of Operations (502-510). These Operations are examples only, and the executed method may omit one or more of the listed Operations, may repeat Operations, may include other Operations, or may execute the Operations concurrently, substantially simultaneously, or in another order, as appropriate or desired. The Operations may be performed automatically by a processor or controller of a machine or computer, such as described below for FIG. 6.

Operation 502 may include receiving one or more inputs with information about a package to be loaded on a pallet and information about a loading operator. The information about the package and the pallet may be received from one or more sensors (e.g., imaging sensors such as a camera or the like), or from a database. The information about the package may include package properties such as package dimensions, package weight, or the like. The inputs may further include an order description. The order description may include the contents of the package and one or more placement criteria for the package. The placement criteria may include stacking instructions (e.g., how much weight can be placed on the package), whether the contents of the package is fragile, or the like.

The inputs may also include information about the loading operator, such as the type of loading operator and the capabilities of the loading operator. The loading operator may be a human, may be a robot, or may be a human working in conjunction with a robot. The capabilities of the loading operator may include how much weight the loading operator can lift, how high the loading operator can reach, maneuverability of the loading operator, or the like.

Operation 504 may include determining a placement location on the pallet for the package. The placement location may be determined by an artificial intelligence (AI) or machine learning (ML) or other algorithm (e.g., a non-AI or non-ML deterministic algorithm) or process and be made based at least in part on the information about the loading operator and the information about the package. The algorithm may include a Monte Carlo algorithm. The algorithm may determine several different candidate placement locations and select one of these candidate placement locations as a maximum likelihood (e.g., a best) placement location. This best location may, for example, minimize the distance of the center of mass of the packages (or groups of packages) on the pallet to the geometrical center of the pallet.

At Operation 506, a visual marking may be displayed at (or in relation to) the placement location. The marking may be an augmented reality projection showing the item placement. The projection may be a laser projection (e.g., an "X") onto the pallet showing where an item should be placed. In another example, a quick response (QR) code may be projected onto the pallet and scanned by a robotic operator with instructions for the robotic operator to load or place an item on the pallet. At Operation 508, the loading operator may be instructed to place the package at the displayed placement location (e.g., at the placement location based on the visual marking). For example, when the loading operator is a robot, the system may send an instruction to place the package at the displayed placement location. In another example, when multiple loading operators are being used, (e.g., a combination of human and robotic), the system may instruct the human to wait for the robot to place its package first (e.g., so the human does not have to bend over to place the next package).

At Operation 510, once the package is placed at the determined placement location, the system may perform an integrity check on the package using a plurality of sensors. The plurality of sensors may include imaging sensors such as cameras, and physical measurement sensors located on the pallet or on a measurement platform below the pallet. The physical sensors may include Force Sensing Resistors (FSRs) place on the pallet at different locations to detect the presence of a package and detect if the package is present in a specific point or location on the pallet and detect if the package is correctly settled or stable (e.g., lying flat) in the assigned location. The physical sensors may also include optical distance sensors, such as infrared sensors or Light Detection and Ranging (LIDAR) sensors. The integrity check may include determining that the package is placed at the proper selected location, whether the package is an expected weight (and thus is likely to contain the expected item), whether the package is stable on the pallet, whether the package appears undamaged, or the like. At least a portion of the integrity check may be performed at a loading operator package pick-up location (e.g., a loading area). For example, before placing the package on the pallet, a manipulator arm may be used so that all sides, edges, or corners of the package may be inspected or viewed by the imaging sensors to check for damage to the package. Thus, the entire package may be viewed whereas once the package is stacked on the pallet portions of the package may be obscured and not well visualized.

When the package passes the integrity check, the system may check to determine that the entire order is ready (e.g., that all packages expected to be loaded are loaded). When the order is determined to be ready, the system may consider the pallet loaded and at that point the pallet may be wrapped (e.g., wrapped in plastic) and moved from the loading area (e.g., stored, stacked on another pallet, loaded into a shipping container or a trailer, or the like). When the order is determined not to be ready at, the system may repeat the Operations of the method to determine the location for placement of the next package. When the package does not pass the integrity check, an error may be displayed or otherwise indicated (e.g., using a blinking light or different colored light, an audible warning, or the like.

Figure 6:
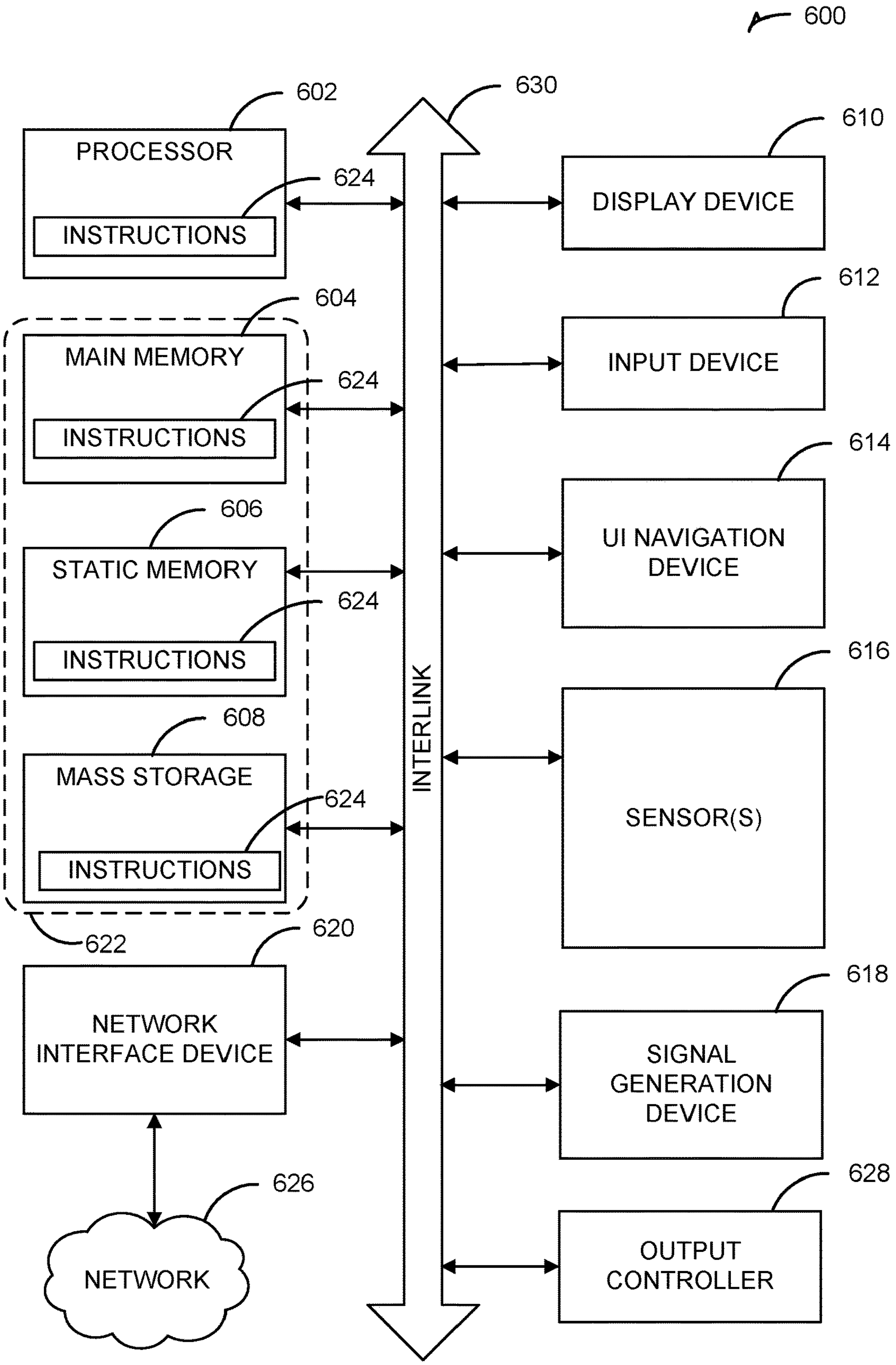
FIG. 6 is a block diagram of an example of an apparatus, device, or machine upon which any one or more of the techniques (e.g., methodologies) discussed herein may perform.

FIG. 6 is a block diagram of an example of an apparatus, device, or machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, field programmable gate array (FPGA), or any combination thereof), a main memory 604 and a static memory 606, some or all of which may communicate with each other via an interlink (e.g., bus) 630. The machine 600 may further include a display unit 610, an input device 612 (e.g., a keyboard or other alphanumeric input device), and a user interface (UI) navigation device 614 (e.g., a mouse). In an example, the display unit 610, input device 612 and UI navigation device 614 may be a touch screen display. The machine 600 may additionally include a storage device 608 (e.g., drive unit or other similar mass storage device or unit), a signal generation device 618 (e.g., a speaker), a network interface device 620 connected to a network 626, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 608 may include a machine readable medium 622 on which is stored one or more sets of data structures or instructions 624 (e.g., software) embodying or used by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 608 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624. The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The term "processor" is synonymous with terms like "controller" and "computer" and should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices.

ADDITIONAL NOTES & EXAMPLES

Example 1 is a pallet loading system, comprising: a processor; and memory including instructions that, when executed by the processor, cause the processor to: receive package loading data, the package loading data including characteristics of a package to be placed on a pallet and characteristics of a loading operator; determine, based on the characteristics of the package and the characteristics of the loading operator, a placement location on the pallet for the package; display a visual marking in relation to the placement location; and output an instruction to the loading operator to place the package at the placement location based on the visual marking.

In Example 2, the subject matter of Example 1 optionally includes subject matter wherein the instructions further cause the processor to: detect the package at the placement location or a loading operator package pick-up location; and perform an integrity check of the package using a plurality of sensors located in a pallet loading area.

In Example 3, the subject matter of Example 2 optionally includes subject matter wherein, responsive to failure of the integrity check of the package, the instructions cause the processor to: display an error; and output a second instruction to the loading operator that includes a mitigation technique to correct the error.

In Example 4, the subject matter of any one or more of Examples 2-3 optionally include subject matter wherein responsive to success of the integrity check of the package, the instructions cause the processor to: receive one or more inputs with information about a second package to be placed on a pallet; determine, based on the information about the second package and the information about the loading operator, a second placement location on the pallet for the second package; display a second visual marking at the second placement location for the second package; instruct the loading operator to place the second package at the second placement location based on the second visual marking; detect the package at the second placement location or the loading operator package pick-up location; and perform an integrity check of the second package using the plurality of sensors located in the pallet loading area.

In Example 5, the subject matter of any one or more of Examples 2-4 optionally include subject matter wherein the plurality of sensors includes one or more of: an image sensor, a force-sensitive resistor (FSR), an infrared sensor, or a light-detection and ranging (LIDAR) sensor.

In Example 6, the subject matter of Example 5 optionally includes subject matter wherein the image sensor includes an RGB camera, and wherein one or more of the infrared sensor, the FSR, or the LIDAR sensor are located on a measurement platform or a sensor array below the pallet.

In Example 7, the subject matter of Example 6 optionally includes subject matter wherein one or more of the infrared sensor, the FSR, or the LIDAR sensor are located on the measurement platform, and wherein the measurement platform includes a hydraulic measurement platform configured to raise between one or more openings in the pallet.

In Example 8, the subject matter of any one or more of Examples 1-7 optionally include subject matter wherein the characteristics of the package includes one or more of: a property of the package, an order description, or placement criteria for the package.

In Example 9, the subject matter of Example 8 optionally includes subject matter wherein the instructions further cause the processor to: determine a fragility rating for the package using the characteristics of the package, and wherein the placement location is determined at least in part on the fragility rating.

In Example 10, the subject matter of any one or more of Examples 1-9 optionally include subject matter wherein the characteristics of the loading operator includes a type of loading operator and a capability of the loading operator.

In Example 11, the subject matter of any one or more of Examples 1-10 optionally include subject matter wherein the placement location is selected from a plurality of candidate placement locations and is determined using an artificial intelligence (AI) or machine learning (ML) algorithm based at least in part on an analysis by the algorithm of the characteristics of the package and the characteristics of the loading operator.

In Example 12, the subject matter of Example 11 optionally includes subject matter wherein the algorithm includes a Monte Carlo algorithm.

Example 13 is a non-transitory machine-readable with instructions stored thereon, which, when executed by a processor of a computing device, cause the processor to: receive package loading data, the package loading data including characteristics of a package to be placed on a pallet and characteristics of a loading operator; determine, based on the characteristics of the package and the characteristics of the loading operator, a placement location on the pallet for the package; display a visual marking in relation to the placement location; and output an instruction to the loading operator to place the package at the placement location based on the visual marking.

In Example 14, the subject matter of Example 13 optionally includes subject matter wherein the instructions further cause the processor to: detect the package at the placement location or a loading operator package pick-up location; and perform an integrity check of the package using a plurality of sensors located in a pallet loading area.

In Example 15, the subject matter of Example 14 optionally includes subject matter wherein, responsive to failure of the integrity check of the package, the instructions cause the processor to: display an error; and output a second instruction to the loading operator that includes a mitigation technique to correct the error.

In Example 16, the subject matter of any one or more of Examples 14-15 optionally include subject matter wherein, responsive to success of integrity check of the package, the instructions further cause the processor to: receive additional package loading data, the additional package loading data including characteristics of a second package to be placed on a pallet; determine, based on the characteristics of the second package and the characteristics of the loading operator, a second placement location on the pallet for the second package; display a second visual marking at the second placement location for the second package; output an additional instruction to the loading operator to place the second package at the second placement location in relation to the second placement location for the second package; detect the package at the second placement location or the loading operator package pick-up location; and perform an integrity check of the second package using the plurality of sensors located in the pallet loading area.

In Example 17, the subject matter of any one or more of Examples 14-16 optionally include subject matter wherein the plurality of sensors includes one or more of: an image sensor, a force-sensitive resistor (FSR), an infrared sensor, or a light-detection and ranging (LIDAR) sensor.

In Example 18, the subject matter of Example 17 optionally includes subject matter wherein the image sensor includes an RGB camera, and wherein one or more of the infrared sensor, the FSR, or the LIDAR sensor are located on a measurement member below the pallet, and wherein the measurement member includes a hydraulic measurement platform configured to raise between one or more openings in the pallet.

In Example 19, the subject matter of any one or more of Examples 14-18 optionally include subject matter wherein the characteristics of the package includes one or more of: a property of the package, an order description, or placement criteria for the package.

In Example 20, the subject matter of Example 19 optionally includes subject matter wherein the instructions further cause the processor to: determine a fragility index for the package using the characteristics of the package, and wherein the placement location is determined at least in part on the fragility index.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A pallet loading system, comprising:

a processor; and memory including instructions that, when executed by the processor, cause the processor to:

receive package loading data, the package loading data including characteristics of a package to be placed on a pallet and characteristics of a loading operator, wherein the characteristics of the loading operator includes a type of loading operator and a capability of the loading operator;

determine, based on the characteristics of the package and the characteristics of the loading operator, a placement location on the pallet for the package;

display a visual marking in relation to the placement location; and output an instruction to the loading operator to place the package at the placement location based on the visual marking.

2. The pallet loading system of claim 1, wherein the characteristics of the package includes one or more of: a property of the package, an order description, or placement criteria for the package.

3. The pallet loading system of claim 2, wherein the instructions further cause the processor to:

determine a fragility rating for the package using the characteristics of the package, and wherein the placement location is determined at least in part on the fragility rating.

4. The pallet loading system of claim 1, wherein the placement location is selected from a plurality of candidate placement locations and is determined using an artificial intelligence (AI) or machine learning (ML) algorithm based at least in part on an analysis by the algorithm of the characteristics of the package and the characteristics of the loading operator.

5. The pallet loading system of claim 4, wherein the algorithm includes a Monte Carlo algorithm.

6. The pallet loading system of claim 1, wherein the instructions further cause the processor to:

detect the package at the placement location or a loading operator package pick-up location; and perform an integrity check of the package using a plurality of sensors located in a pallet loading area.

7. The pallet loading system of claim 6, wherein, responsive to failure of the integrity check of the package, the instructions cause the processor to:

display an error; and output a second instruction to the loading operator that includes a mitigation technique to correct the error.

8. The pallet loading system of claim 6, wherein responsive to success of the integrity check of the package, the instructions cause the processor to:

receive one or more inputs with information about a second package to be placed on a pallet;

determine, based on the information about the second package and the information about the loading operator, a second placement location on the pallet for the second package;

display a second visual marking at the second placement location for the second package;

instruct the loading operator to place the second package at the second placement location based on the second visual marking;

detect the package at the second placement location or the loading operator package pick-up location; and perform an integrity check of the second package using the plurality of sensors located in the pallet loading area.

9. The pallet loading system of claim 6, wherein the plurality of sensors includes one or more of: an image sensor, a force-sensitive resistor (FSR), an infrared sensor, or a light-detection and ranging (LIDAR) sensor.

10. The pallet loading system of claim 9, wherein the image sensor includes an RGB camera, and wherein one or more of the infrared sensor, the FSR, or the LIDAR sensor are located on a measurement platform or a sensor array below the pallet.

11. A non-transitory machine-readable with instructions stored thereon, which, when executed by a processor of a computing device, cause the processor to:

receive package loading data, the package loading data including characteristics of a package to be placed on a pallet and characteristics of a loading operator, wherein the characteristics of the loading operator includes a type of loading operator and a capability of the loading operator;

determine, based on the characteristics of the package and the characteristics of the loading operator, a placement location on the pallet for the package;

display a visual marking in relation to the placement location; and output an instruction to the loading operator to place the package at the placement location based on the visual marking.

12. The non-transitory machine-readable of claim 11, wherein the instructions further cause the processor to:

detect the package at the placement location or a loading operator package pick-up location; and perform an integrity check of the package using a plurality of sensors located in a pallet loading area.

13. The non-transitory machine-readable of claim 12, wherein, responsive to failure of the integrity check of the package, the instructions cause the processor to:

display an error; and output a second instruction to the loading operator that includes a mitigation technique to correct the error.

14. The non-transitory machine-readable of claim 12, wherein, responsive to success of integrity check of the package, the instructions further cause the processor to:

receive additional package loading data, the additional package loading data including characteristics of a second package to be placed on a pallet;

determine, based on the characteristics of the second package and the characteristics of the loading operator, a second placement location on the pallet for the second package;

display a second visual marking in relation to the second placement location for the second package;

output an additional instruction to the loading operator to place the second package at the second placement location based on the second visual marking;

detect the package at the second placement location or the loading operator package pick-up location; and perform an integrity check of the second package using the plurality of sensors located in the pallet loading area.

15. The non-transitory machine-readable of claim 12, wherein the plurality of sensors includes one or more of: an image sensor, a force-sensitive resistor (FSR), an infrared sensor, or a light-detection and ranging (LIDAR) sensor.

16. The non-transitory machine-readable of claim 15, wherein the image sensor includes an RGB camera, and wherein one or more of the infrared sensor, the FSR, or the LIDAR sensor are located on a measurement member below the pallet, and wherein the measurement member includes a hydraulic measurement platform configured to raise between one or more openings in the pallet.

17. The non-transitory machine-readable of claim 12, wherein the characteristics of the package includes one or more of: a property of the package, an order description, or placement criteria for the package.

18. The non-transitory machine-readable of claim 17, wherein the instructions further cause the processor to:

determine a fragility index for the package using the characteristics of the package, and wherein the placement location is determined at least in part on the fragility index.

19. A pallet loading system, comprising:

a processor; and memory including instructions that, when executed by the processor, cause the processor to:

receive package loading data, the package loading data including characteristics of a package to be placed on a pallet and characteristics of a loading operator;

determine, based on the characteristics of the package and the characteristics of the loading operator, a placement location on the pallet for the package;

display a visual marking in relation to the placement location; and output an instruction to the loading operator to place the package at the placement location based on the visual marking;

detect the package at the placement location or a loading operator package pick-up location; and perform an integrity check of the package using a plurality of sensors located in a pallet loading area, wherein the plurality of sensors includes an image sensor comprising an RGB camera, and one or more of an infrared sensor, a force-sensitive resistor (FSR), or a light-detection and ranging (LIDAR) sensor located on a measurement platform or a sensor array below the pallet, wherein the measurement platform includes a hydraulic measurement platform configured to raise between one or more openings in the pallet.

* * * * *